Patented Sept. 6, 1938

2,128,932

UNITED STATES PATENT OFFICE 2,128,932

PREPARATION OF RESINOUS REACTION PRODUCTS OF SULPHUR DIOXIDE AND OLEFINES

Louis H. Fitch, Jr., and Frederick E. Frey, Bartlesville, Okla., assignors to Phillips Petroleum Company, Bartlesville, Okla., a corporation of Delaware No Drawing. Application March 16, 1932, Serial No. 599,350

7 Claims. (Cl. 260—2)

The present invention relates to the catalytic preparation of resinous reaction products of sulphur dioxide and olefines, and to catalysts for effecting such reactions. The invention also relates to a method of molding the solid products of the olefine-sulphur dioxide reaction.

A primary object of the invention is the provision of catalysts adapted to enhance the reaction between sulphur dioxide and olefines, and to cause such reaction to take place rapidly even in complete darkness.

A further object of the invention is the provision of a heat-pressure molding process for the production of coherent resinous products from the reaction products of sulphur dioxide and olefines.

Additional objects will become apparent as the description of the invention proceeds.

While the reaction between sulphur dioxide and certain olefines to form a resin-like product is known, the reaction as therein described, takes place readily only in the presence of sunlight or some other source of actinic light.

Heat alone has been found to be of but limited effectiveness in bringing about interaction between sulphur dioxide and olefines to form a resin-like product. Many olefines which react rapidly with sulphur dioxide in the presence of light, do not react readily in the dark, even at temperatures somewhat in excess of 100° C.

According to the present invention, the reaction can be made to take place in complete darkness in the presence of small amounts of chemical agents which exert a catalytic effect. It has been found that by the addition of suitable catalysts, the preparation of resinous reaction products of sulphur dioxide and olefines may be effected at low temperatures in comparatively short reaction times, and in the absence of means for providing actinic light. The catalysts, however, are also effective in conjunction with elevated temperatures and/or light.

The catalysts which are suitable for catalyzing the reaction between sulphur dioxide and olefines under the conditions outlined are oxygen, organic peroxides, salts of silver and monovalent copper, nitric oxide, and nitrogen dioxide. Silver sulphate and sulphide also catalyze the reaction. Cuprous chloride is a catalyst for the reaction.

For example, 2-butene and sulphur dioxide were sealed in liquid mixture in a glass tube with one-half of one percent by weight of benzoyl peroxide in solution. The reagents were completely converted into a solid resin on standing for three days in the dark at 80° F. Under the same conditions, in the absence of a catalyst, 2-butene and sulphur dioxide failed to react to any appreciable extent in the course of three months.

With the same materials and conditions, small quantities of another peroxide, diethyl peroxide, induced the complete conversion of the reagents to resin in four days. Small quantities of silver nitrate induced the reaction to completion in thirty minutes.

The aforementioned catalysts have been found useful in inducing and accelerating the reaction of other olefines such as ethylene, propylene, butene-1, pentene-1, hexene-1, heptene-1, and isopropyl ethylene, with sulphur dioxide both in the presence and absence of light and diluents. The reaction of diolefines such as 1.3-butadiene and cyclopentadiene with sulphur dioxide is likewise accelerated by these catalysts.

The products obtained when using the catalysts are similar to those obtained when the reaction is carried out in the presence of light alone. In some cases, however, they may exhibit differences in softening temperature and other physical characteristics, these differences being apparently due to differences in the stage of polymerization of the product, and not to the inclusion of the catalyst in the product as an impurity. Regardless of how produced, they usually form as a glassy, viscous material in the presence of an excess of sulphur dioxide which dissolves the resin, except in the case of ethylene, propylene and some dienes, which yield a resin insoluble in sulphur dioxide.

The polymerization of these materials is not primarily a reaction at the surface of the catalyst, but is principally due to the presence of catalyst dissolved in the olefine, $SO_2$ mixture. Consequently, any means by which the olefine, sulphur dioxide, and catalyst may be mixed properly, and held at the requisite temperature for a sufficient period of time, is satisfactory for the formation of the product.

In molding resins obtained in either of the ways indicated in the preceding paragraph, certain difficulties are encountered. The resinous materials can be melted under ordinary conditions only with considerable swelling and decomposition, and hence cannot be formed into useful shapes by melting and pouring into molds. The formation of the resin in the mold, either in the presence or absence of pressure substantially above the vapor pressure of the reacting mixture, is not practical, due to the large volume shrinkage which accompanies the chemical reaction, and the difficulty of obtaining a pure and homogeneous product.

It has been found, however, that if the solid products of the olefine-sulphur dioxide reaction be sufficiently pure (or be purified by heating, drying or in other suitable manner), and treated in a mold under suitable conditions of heat and pressure, products of very valuable properties may be produced.

The resins produced from the reaction of 1-butene, 2-butene or similar olefines with liquid sulphur dioxide may, for example, be heated in granular form to temperatures of 110° C. to 170° C. in a mold under pressures of 200 to 2000 or more pounds per square inch to produce a vitreous transparent or semi-transparent coherent body of good mechanical strength and hardness.

Similarly, the resin produced from propylene and liquid sulphur dioxide, which separates as an insoluble powder from the reaction mixture, may be heated to temperatures of 150° C. to 240° C. in a mold under pressure to produce a very hard vitreous body varying from opaque to transparent according to conditions of temperature and pressure. High pressures favor the formation of well fused, transparent and translucent bodies, though the pressures necessary for this purpose vary greatly with the different resins.

In the two foregoing examples, the 1-butene resin may be molded into a transparent product at suitable temperatures under pressures around 200 pounds per square inch, whereas the propylene resin may generally be more advantageously molded at 2000 pounds per square inch or over.

In general, the mold is cooled before releasing the pressure and removing the product, but by the selection of the lower molding temperatures and pressures sufficient for the resin under treatment, this cooling may be avoided and the resin removed from the mold at molding temperature.

The duration of the heat treatment is not usually of primary importance, as in the case of phenol-formaldehyde resins, though it should be long enough to enable all the resin to come to a fairly uniform temperature, and short enough to avoid serious decomposition of the resin. The resin may, however, usually be heated to molding temperature prior to the application of pressure without serious decomposition. If the resin to be molded has been heated to molding temperature prior to the application of pressure, the time required to produce a coherent resin of desired properties need usually not exceed the time required to develop the desired pressure and, in some cases, cool the mold somewhat. The molding process appears to depend predominantly on a softening or partial fusion under pressure, though further polymerization during the application of heat may also contribute to the formation of a satisfactory product. The application of pressure is necessary not merely for the shaping of the molded mass, but also to secure proper fusion and coherence of the resin particles at temperatures sufficiently low to avoid serious decomposition of the resin.

The nature of the molded products is dependent upon both the nature of the original material and the conditions of heat and pressure treatment. In general, they are colorless or slightly brown, and quite hard and tough, but may be either opaque, translucent or highly transparent. The resin may be compounded with fillers, dyes, pigments and the like to produce desired variations in mechanical properties and appearance.

The molded products are similar chemically to the material used for molding. They are not readily attacked by acids, alkalis or halogens, and are insoluble in most solvents, although liquid sulphur dioxide is a good solvent for most of them. The products are suitable for a wide variety of uses.

What is claimed and desired to be secured by Letters Patent is:

1. In the process of making resinous material from sulphur dioxide and an olefine, the step of reacting the mixture in the presence of a salt of silver of the group consisting of silver sulphate, silver sulphite and silver nitrate, as catalyst.

2. The process of preparing compounds of high molecular weight which comprises reacting sulphur dioxide and olefines in the presence of a catalyst consisting essentially of silver nitrate.

3. The process of preparing resinous polymeric compounds of high molecular weight which comprises reacting sulphur dioxide and olefines in the presence of a relatively small quantity of a catalyst which is soluble in the olefine-sulphur dioxide mixture, and which is capable of inducing the reaction of sulphur dioxide with 2-butene at an appreciable rate in the absence of light.

4. The process of preparing resinous polymeric compounds of high molecular weight which comprises reacting sulphur dioxide and olefines in the presence of a relatively small quantity of a catalyst which is soluble in the olefine-sulphur dioxide mixture, and which is capable of inducing the reaction of sulphur dioxide with 2-butene at an appreciable rate in the absence of light with the formation of a product essentially similar to that produced by the photochemical reaction of these substances.

5. The process of preparing compounds of high molecular weight which comprises reacting sulphur dioxide and olefines in the presence of silver nitrate.

6. The process of preparing compounds of high molecular weight which comprises reacting sulphur dioxide and olefines in the presence of silver sulphite.

7. The process of preparing compounds of high molecular weight which comprises reacting sulphur dioxide and olefines in the presence of silver sulphate.

LOUIS H. FITCH, Jr.
FREDERICK E. FREY.